United States Patent
Muramatsu

[11] Patent Number: 5,920,269
[45] Date of Patent: *Jul. 6, 1999

[54] REPEAT CALL MESSAGE TRANSMISSION RADIO PAGER WITH FRONT END DEACTIVATED FOLLOWING RECEPTION OF A MESSAGE

[75] Inventor: Toshihiko Muramatsu, Tokyo, Japan

[73] Assignee: NEC Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/686,667

[22] Filed: Jul. 26, 1996

[30] Foreign Application Priority Data

Jul. 27, 1995 [JP] Japan .................................. 7-191811

[51] Int. Cl.⁶ .................................................... H04Q 7/18
[52] U.S. Cl. ............................... 340/825.34; 340/825.44; 340/311.1; 455/38.3; 455/343; 370/311
[58] Field of Search ........................ 340/825.34, 825.44, 340/825.47, 825.52, 825.72, 311.1; 455/458, 426, 31.1, 31.2, 38.2, 38.3, 38.1, 343; 370/310, 311, 312, 313, 314

[56] References Cited

U.S. PATENT DOCUMENTS

| | | | |
|---|---|---|---|
| 4,835,777 | 5/1989 | DeLuca et al. | 340/825.44 X |
| 4,839,639 | 6/1989 | Sato et al. | 340/825.44 |
| 5,230,084 | 7/1993 | Nguyen | 455/38.3 |
| 5,376,929 | 12/1994 | Rakolta et al. | 340/825.44 X |
| 5,376,975 | 12/1994 | Romero et al. | 340/825.44 |
| 5,392,457 | 2/1995 | Davis et al. | 455/38.3 |
| 5,414,419 | 5/1995 | Schwendeman et al. | 340/825.44 |
| 5,459,457 | 10/1995 | Sharpe | 340/825.52 X |
| 5,493,282 | 2/1996 | Petreye et al. | 340/825.44 X |
| 5,649,315 | 7/1997 | Eaton | 340/825.44 X |
| 5,682,148 | 10/1997 | Gaskill et al. | 340/825.44 |

FOREIGN PATENT DOCUMENTS

| | | |
|---|---|---|
| 63-13432 | 1/1988 | Japan . |
| 1109927 | 4/1989 | Japan . |
| 4-211529 | 8/1992 | Japan . |
| 5316018 | 11/1993 | Japan . |
| 5347577 | 12/1993 | Japan . |

OTHER PUBLICATIONS

Office Action dated Jan. 27, 1998 issued by the Japanese Patent Office for counterpart Japanese Apln. No. 07–191811 and English translation of relevant portions of the Office Action.

Office Action dated Jul. 21, 1998 issued by the Japanese Patent Office for counterpart Japanese Appln. No. 07–191811 and English translation of relevant portions of the Office Action.

*Primary Examiner*—Michael Horabik
*Assistant Examiner*—William H. Wilson, Jr.
*Attorney, Agent, or Firm*—Ostrolenk, Faber, Gerb & Soffen, LLP

[57] ABSTRACT

In a repeat call paging system, a paging signal is transmitted in a sequence of frames each comprising a series of fields respectively assigned to different pagers. Each of the fields contains a copy of a message for a pager and the message copy is repeatedly transmitted in successive frames. The front end of the pager is activated to produce a baseband signal to determine whether a field assigned to the pager is contained therein and to synchronize the pager to a frame. If the assigned field is not contained in the baseband signal, the front end is deactivated until the assigned field appears in a subsequent frame. If the assigned field is contained in the baseband signal, a copy of the message for the pager is searched. If the message copy is not detected, the front end is deactivated until the assigned field appears in the next frame and a search is repeated for a message copy. If a message copy is detected, a count value is set and the front end is deactivated until the assigned field appears in the next frame. The front end is then activated again for an interval sufficient to receive the assigned field in the subsequent frame to resynchronize the pager and the count value is decremented by one. The front end is deactivated again until the assigned field appears in the next frame, and the process is repeated for resynchronization until the count value is decremented to zero.

7 Claims, 3 Drawing Sheets

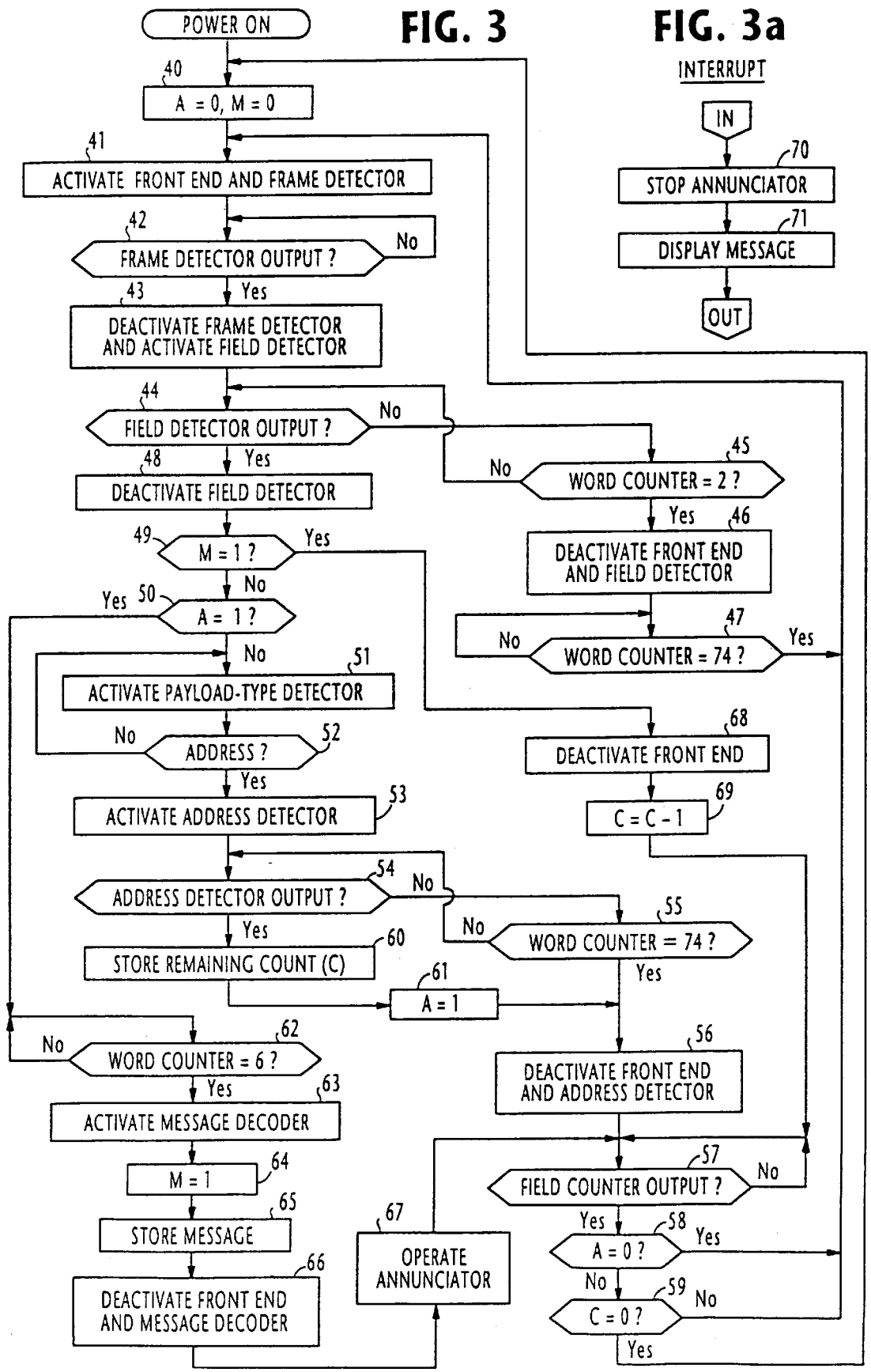

REPEAT CALL MESSAGE TRANSMISSION RADIO PAGER WITH FRONT END DEACTIVATED FOLLOWING RECEPTION OF A MESSAGE

BACKGROUND OF THE INVENTION

1. Field of the Invention

The present invention relates generally to selective calling radio pagers of a repeat call paging system where multiple copies of a message are transmitted in successive frames, and more specifically to a power savings technique for saving the battery power of the radio pagers.

2. Description of the Related Art

To increase the probability of signal reception by a radio pager in a wide variety of communication environments, a paging signal is transmitted in a sequence of frames each containing a series of fields which are respectively assigned to different pagers. A pager's message is copied and multiple copies of the message are transmitted in the assigned field of successive frames. Since the number of fields in a frame is limited, each field is commonly assigned to a group of pagers. As a result, a pager has to determine the identity of its assigned field on receiving a frame and if the identity of the assigned field is established and the pager's address is contained in the assigned field of that frame the pager proceeds to determine whether the assigned field of the next frame contains a message for the pager. For power savings purposes, timing circuitry is provided to turn off the battery supply to the power-consuming front end (radio frequency section) during periods in which fields assigned to other pagers are being transmitted. However, the front end is repeatedly activated on receiving an assigned field during successive frames even though a message has already been received. It is therefore desirable to still save the battery power once a message copy is received.

SUMMARY OF THE INVENTION

It is therefore an object of the present invention to improve the power savings performance of a radio pager during successive reception of message copies.

According to a broader aspect of the present invention, there is provided a power saving control circuit for a radio pager including a radio frequency (RF) section for receiving a paging signal transmitted in a sequence of frames each comprising a series of fields respectively assigned to different pagers, each of the fields containing a copy of a message which is repeatedly transmitted in successive frames. The power saving control circuit activates the RF section for an interval sufficient to receive a field which is assigned to the pager and contains a copy of the message and deactivates the RF section either when the pager is receiving a field not assigned to the pager or when the pager is receiving a field which is assigned to the pager but contains a subsequent copy of the message if a previous copy of the message is already received.

According to a second aspect, the present invention provides a radio pager comprising a radio frequency (RF) section for receiving a paging signal transmitted in a sequence of frames each comprising a series of fields respectively assigned to different pagers, each of the fields containing a copy of a message which is repeatedly transmitted in successive frames, field detector means for producing an output signal when a field assigned to the pager is detected in the baseband signal, payload detector means for detecting a message copy in the assigned field detected by the field detector means, and control means for activating the RF section for an interval sufficient to receive a field containing a copy of the message and deactivating the RF section either when a field assigned to the pager is not detected by the field detector or when a field containing a copy of the message is detected by the payload detector means if a previous copy is already detected by the payload detector means.

According to a third aspect, the present invention provides a radio pager for receiving a paging signal transmitted in a sequence of frames each comprising a series of fields respectively assigned to different pagers, each of the fields containing a copy of a message which is repeatedly transmitted in successive frames. The pager includes a radio frequency (RF) section for receiving and converting the paging signal into a baseband signal, when activated, field detector means for making a search through each frame of the baseband signal and producing an output signal when a field of the frame which is assigned to the pager is detected, payload detector means for producing an output signal when a copy of the message for the pager is contained in the field detected by the field detector means, counter means for measuring a time interval elapsed from the detection of a field by the field detector means and producing an output signal when the measured time interval coincides with timing at which the field assigned to the pager occurs in a subsequent frame, and control means for activating the RF section for a first period sufficient to allow one of the field detector means and the payload detector means to produce the output signal thereof, activating the RF section for a second period from a first occurrence of the output signal of the counter means to an instant the message copy is detected by the payload detector means, and activating the RF section for a third period from a second occurrence of the output signal of the counter means to an occurrence of the output signal of the field detector means.

According to a fourth aspect, the present invention provides a power saving method for a radio pager which includes a radio frequency (RF) section for receiving a paging signal transmitted in a sequence of frames each comprising a series of fields respectively assigned to different pagers, each of the fields containing an address or a copy of a message which is repeatedly transmitted in successive frames, the RF section producing a baseband signal of the paging signal, the method comprising the steps of:

a) activating the RF section to produce the baseband signal;

b) determining whether a field which is assigned to the pager is contained in the baseband signal and synchronize the pager to a frame of the baseband signal;

c) if the assigned field is determined to be not contained in the baseband signal, deactivating the RF section until the field assigned to the pager occurs in a subsequent frame and repeating the steps (a) and (b);

d) if the assigned field is determined to be contained in the baseband signal, determining whether a copy of the message for the pager is contained in the assigned field;

e) if the message copy is determined to be not contained in the assigned field, deactivating the RF section until the assigned field occurs in a subsequent frame and repeating the step (d);

f) if the message copy is determined to be contained in the assigned field, setting a count value, and deactivating the RF section until the assigned field occurs in a subsequent frame;

g) activating the RF section again, decrementing the count by one, repeating the step (b) to resynchronize the pager to a frame of the baseband signal, and deactivating the RF section until the assigned field occurs in a subsequent frame; and h) repeating the step (g) until the count value is decremented to zero.

BRIEF DESCRIPTION OF THE DRAWINGS

The present invention will be described in further detail with reference to the accompanying drawings, in which:

FIG. 3 is a flowchart for power savings operation performed by a microprocessor-based controller, and FIG. 3a is a flowchart of an interrupt routine for displaying a received message.

DETAILED DESCRIPTION

Figure 1:
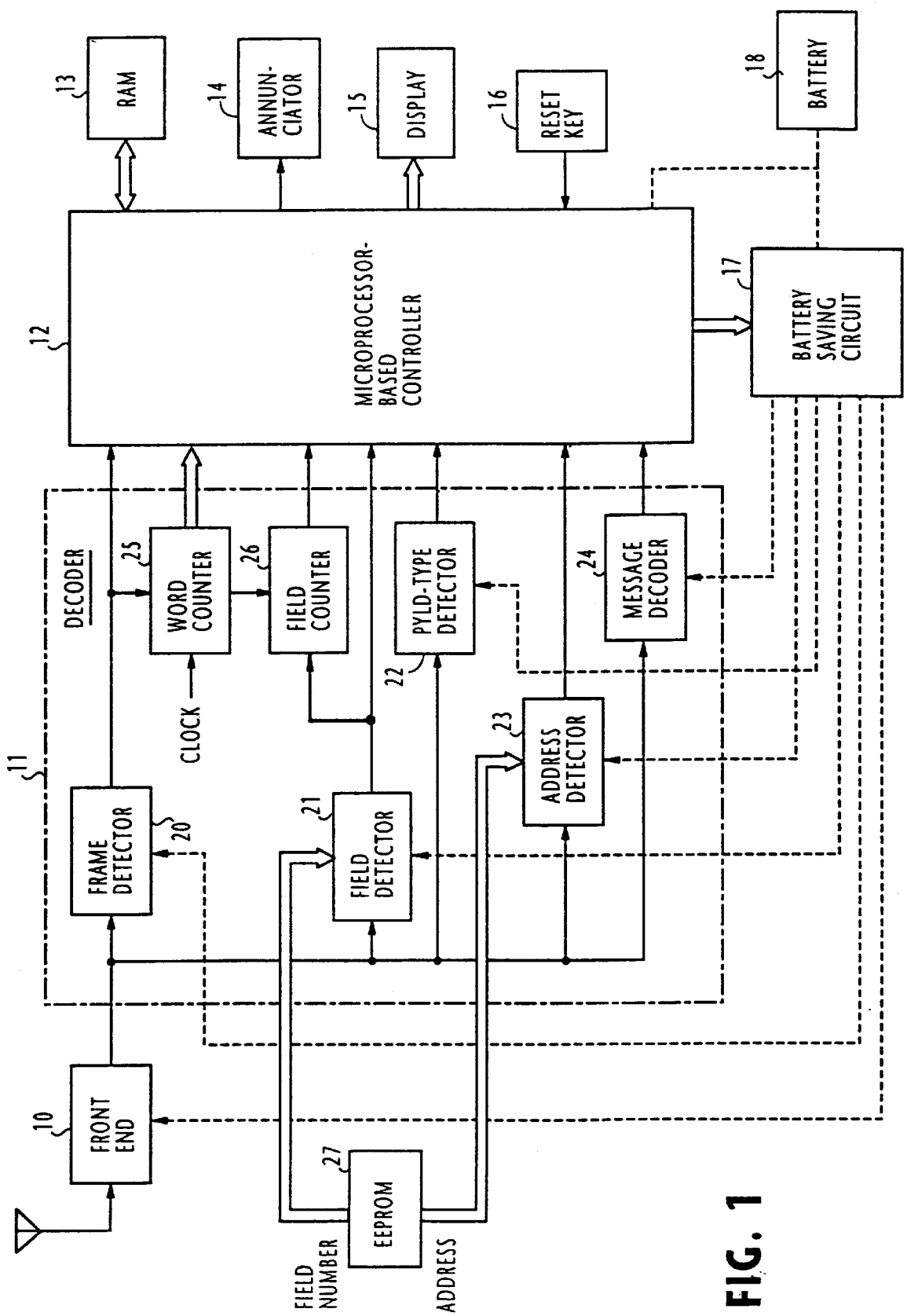
FIG. 1 is a block diagram of a power-saving radio display pager according to the present invention.

In FIG. 1, a power-saving radio display pager according to the present invention comprises a radio-frequency section or front end 10 where a coded paging signal is received, converted to baseband, amplified and shaped into a waveform suitable for digital processing. As usual, the baseband paging signal is one that is encoded at the transmit site to permit error detection and correction by a decoder unit 11 at the pager. A microprocessor-based controller 12 is provided to receive signals from the decoder unit 11 to control its peripheral circuits including a RAM (random access memory) 13, an annunciator 14, a liquid crystal display 15 and a battery saving circuit 17 which provides power supply from a battery 18 to the front end 10 and the decoder unit 11.

Figure 2:
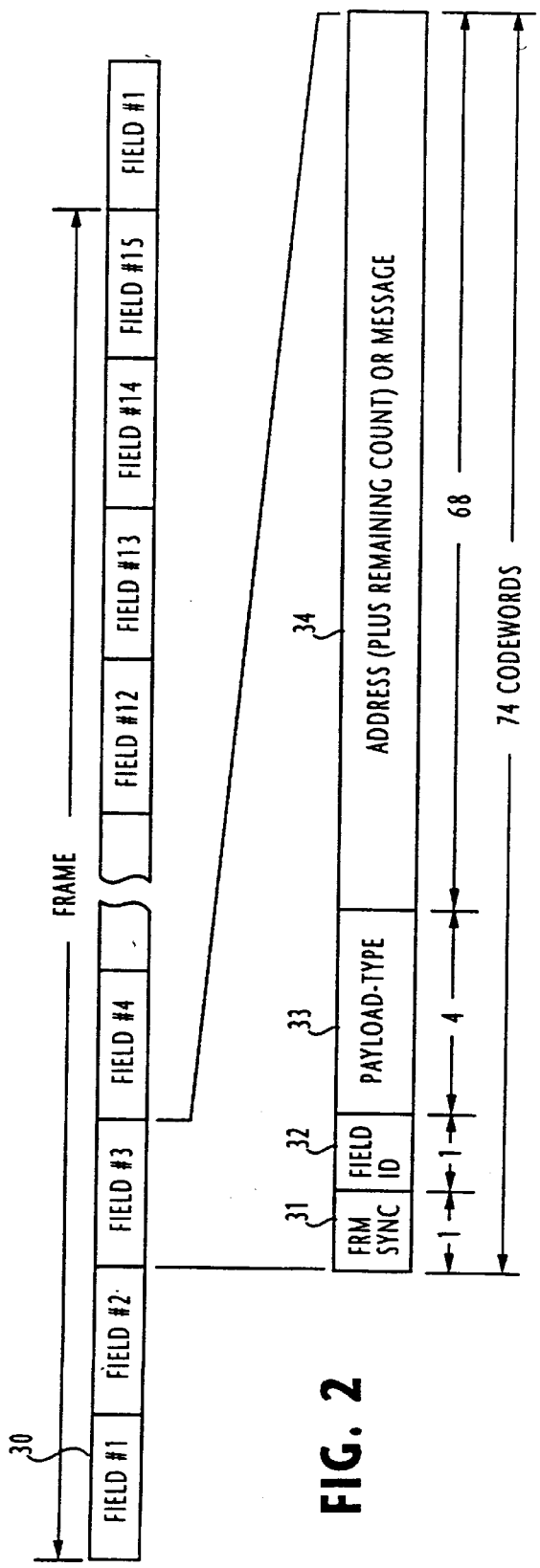
FIG. 2 shows a frame structure employed in the present invention.

As shown in FIG. 2, the paging signal is transmitted in the form of a series of frames, each containing a sequence of fields 30 of 74-codeword length. Typically, fields #1 to #15 are provided. The pager is assigned one of the fields to receive a page contained in the assigned field. According to this format, copies of a page are transmitted a predetermined number of times to increase the chance of page reception even under unfavorable channel conditions. Each field 30 is divided into a sequence of subfields 31 to 34 for frame synchronization, field identification, payload-type indication and address (plus a remaining count value) or message transmission, respectively. The remaining count value indicates the number of message copies which will follow.

Decoder unit 11 includes a frame detector 20, a field detector 21, a payload-type detector 22, an address detector 23, and a message decoder 24. Each of these detectors and the message decoder are activated by the controller 12 via battery saving circuit 17 to start decoding a baseband signal from the front end 10 to recover a bit sequence. Frame detector 20 is essentially a bit/frame synchronizer for establishing bit and frame timing with a received frame. When frame synchronization is established, frame detector 20 enables a modulo-74 word counter 25 to permit it to start counting clock pulses. Word counter 25 produces a binary output indicating the word count of codewords that have been counted and a carry signal when the word count reaches its full count (=73). The carry signal of word counter 25 is counted by a modulo-15 field counter 26 when the latter is enabled in response to the output of field detector 21, to produce an output when its full count is reached. Controller 12 uses the binary output of word counter 25 as an indication of the time lapse from the starting point of a field and uses the output of field counter 26 as an indication that the end point of the field is reached.

The field detector 21 and address detector 23 are associated with an EEPROM (electrically erasable programmable read-only memory) 27 in which the pager's field identification number and the pager's address are stored. Field detector 21 compares a field identification number contained in the subfield 32 of a received frame with the stored field number and, when they match, supplies an output to the controller 12. In a similar manner, the address detector 23 compares an address contained in the subfield 34 of the received frame and the stored address and, when they match, supplies an output to the controller 12.

The operation of the controller 12 will be explained with reference to the flowchart of FIG. 3. When the pager is powered on, a program execution starts with initialization step 40 where the controller resets an address flag A and a message flag M to zero. At step 41, controller 12 activates front end 10 and frame detector 20, and proceeds to step 42 to determine whether the frame detector 20 produces an output signal indicating that a frame synchronization has been established. If this is the case, flow proceeds to step 43 to deactivate the frame detector 20 and activate the field detector 21. Controller 12 checks for the presence of an output signal from field detector 21 by repeatedly executing steps 44 and 45 until the word counter 25 yields a count =2. If the pager's field number is not contained in a received field, the word count becomes equal to 2 and flow proceeds from step 45 to step 46 to deactivate both of the front end 10 and field detector 21, and controller 12 waits until the word counter 25 reaches its full count (step 47) before returning to step 41. If the pager's field number is contained in the received field, flow proceeds from step 44 to step 48 to deactivate the field detector 21. The message flag M is then checked at step 49. If no message has been received, the message flag M is zero and flow proceeds to step 50 to check to see if the address flag A is set to 1. If not, flow proceeds to step 51 to activate the payload-type detector 22 until it is determined that the payload contained in the subfield 34 is an address (step 52). Flow proceeds from step 52 to step 53 to activate the address detector 23 to check to see if the address in the subfield 34 matches the pager's address stored in memory 27. For this purpose, steps 54 and 55 are looped until the word counter 25 reaches the full count value to determine whether the address detector 23 produces an output indicating a match between the address received and the one stored in memory 27 or the word counter 25 produces a full-count indicating output.

If there is no match between the two addresses, the decision at step 55 is affirmative and flow proceeds to step 56 to deactivate the front end 10 and address detector 23. Until the field counter 26 produces a full-count output (step 57) the power supply to the front end 10 is turned off. When the field counter 26 has counted fifteen word-counter outputs (i.e., fifteen fields corresponding to a frame interval) from the instant the pager's assigned field is detected, it produces a full-count output, and flow proceeds from step 57 to step 58 to check to see if the address flag A is 0. If the decision is affirmative, flow returns to step 41 to activate the front end 10 and frame detector 20 again. Therefore, the instant the front end 10 is activated again coincides with the beginning of the pager's assigned field in the next frame.

If the address in the pager's field matches the address in memory 27, address detector 23 produces an output and flow proceeds from step 54 to step 60 to store the remaining count value (C) that accompanies the transmitted address. At step 61, the address flag A is set equal to 1 and the controller executes steps 56 to 59. At step 59, controller 12 determines whether the remaining count C is zero. If not, flow returns to step 41. As will be described, the count C is decremented each time a message copy is received. If C becomes equal 0, flow returns to the starting point of the routine to initialize the address and message flags.

After the reception of a pager's field containing the pager's address in a given frame, which was detected at step 54, setting flag A to 1 the front end 10 has been rendered inactive until the pager's assigned field is received again during the next frame, whereupon the controller 12 executes steps 41–44 and 48–50. Since the address flag A is set to 1, flow proceeds from step 50 to step 62 to wait until the word counter 25 counts six codewords. The counting of the sixth codeword by the word counter 25 coincides with the beginning of the payload subfield 34. Thus, controller 12 proceeds to step 63 to activate the message decoder 24. At step 64, the message flag M is set to 1 and the message decoded by message decoder 24 is stored into RAM 13 (step 65). Front end 10 and message decoder 24 are deactivated (step 66) and the annunciator 14 is operated to alert the pager's owner of the arrival of a call. Controller 12 now executes steps 57 to 59.

If the message copy just received is other than the last one, the decision at step 59 is negative and flow returns to step 41 in order to receive the field data in the next frame. Steps 42 to 44 and 48 are executed, and at step 49, the controller 12 recognizes that the message flag M has been set to 1 and proceeds from step 49 to step 68 to deactivate the front end 10 and decrement the stored remaining count value C by 1 at step 69, and executes steps 57 to 59. Therefore, whenever a message copy is received the count C is decremented by 1. When the last message copy is received, the count C becomes zero and flow returns to the starting point of the power saving routine.

During each of the pager's successive fields in which the second to the last message copy are received, controller 12 loops through steps 41–44, 48, 49, 68, 69 and 57–59, so that front end 10 is in a power-on state for a period of only two codewords. Namely, it is active from the beginning of the frame sync subfield 31 to the end of the field identifier subfield 32.

As illustrated in FIG. 3a, when the pager's owner depresses the reset key 16, recognizing that a call has arrived, an interrupt routine is invoked to stop the annunciator 14 (step 70) and the message stored in RAM 13 is displayed on the display unit 15 (step 71). After executing step 71, flow returns to the point of the main routine from where it made an exit to the interrupt routine.

Figure 4:
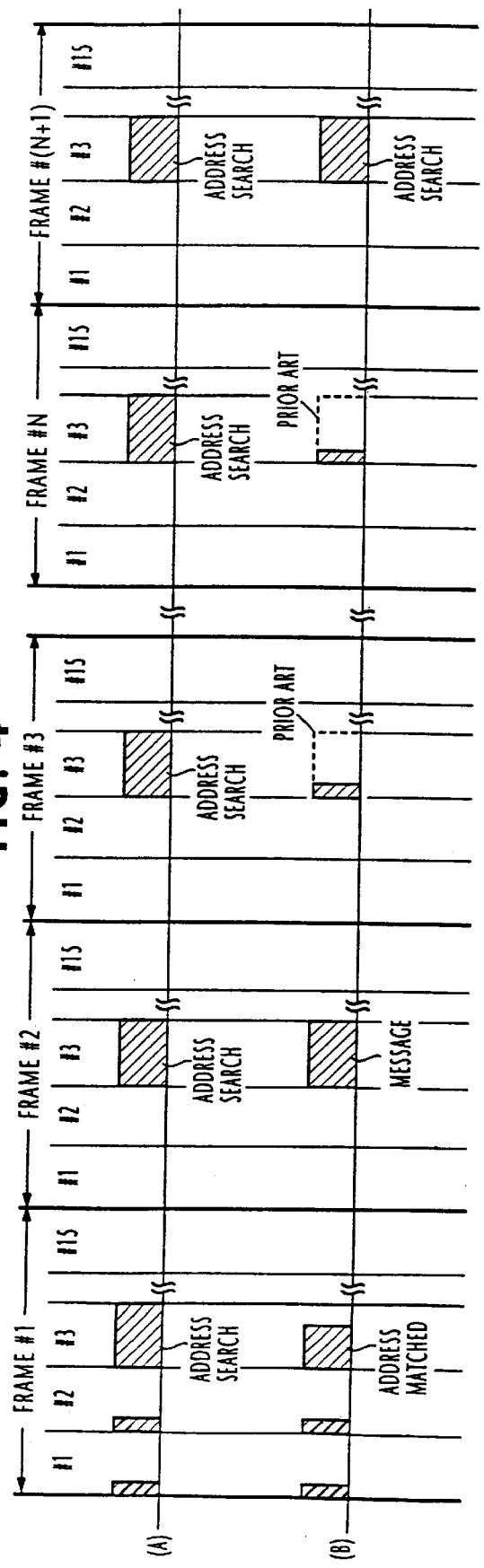
FIG. 4 is a timing diagram useful for describing the power savings operation of the present invention.

For a better understanding of the present invention, a timing diagram is illustrated in FIG. 4 by assuming that field #3 is assigned to the pager. Part (A) of FIG. 4 illustrates one mode of reception where each of field #3 does not contain the pager's address and part (B) illustrates one where the field #3 of frame #1 contains the pager's address and message copies are subsequently transmitted during frames #2 to #N.

In the case of part (A) of FIG. 4, during field #1 of frame #1, steps 40 to 47 are executed and during field #2 steps 41 to 47 are executed, thus activating the front end 10 for a period of two codewords in each of these fields. During field #3 of frame #1, steps 41–44 and 48–58 are executed to activate the front end for the full period of field #3. The same process is repeated during subsequent frames.

In the case of part (B) of FIG. 4, the operation of the controller 12 is the same for the first and second fields of frame #1 as in the case of part (A) of FIG. 4. During field #3 of frame #1, steps 41–44, 48–54, 60–61 and 56–59 are executed to activate the front end until the address matching is detected. During field #3 of frame #2, controller 12 executes steps 41–44 and 48–50, recognizes that flag A is 1 and executes 62–67 and 57–59 for message reception. During field #3 of frame #3, controller 12 executes steps 41–44 and 48–49 to recognize that flag M is set to 1, and executes steps 68–69 and 57–59, so that the front end 10 is activated for a period of two codewords for frame synchronization and field number detection and to the remaining count C is decremented by 1. The same process is repeated until the count C=0 is reached during frame #N. As a result, front end 10 is activated for a period of only two codewords during each field #3 of frames #3 to #N. During field #3 of frame #(N+1), controller 12 executes steps 40–44 and 48–58 for making an address search.

During frames #3 to #N, the front end of prior art pager was activated for the full period (i.e., 74-codeword length) of pager's field as indicated by dotted-lines in FIG. 4. Whereas, the present invention achieves power savings by reducing the active period of the power-consuming front end 10 from the prior art 74-codeword period to two-codeword period when successive messages are received. In addition, since the message decoder 24 remains inactive during such periods, a further power savings effect can be obtained.

The two-codeword activation of the front end 10 during successive frames in which the second and thereafter copies of the message appear has the effect of resynchronizing the counters 25 and 26 to the transmitted frames.

What is claimed is:

1. A power saving radio pager, comprising:
   a radio frequency receiver for receiving a sequence of frames each comprising a predetermined number of fields respectively assigned to different pagers such that a particular one of the predetermined number of fields within each received frame is assigned to the radio pager, each of the fields containing a copy of a message which is repeatedly transmitted in a predetermined number of successive frames; and
   a controller for activating the receiver for a time interval sufficient to receive a new message addressed to the radio pager in a field which is assigned to the radio pager in a frame of a block of predetermined number of successive frames, each frame in the block containing a copy of the received message, and for activating the receiver for a time interval sufficient to receive only a synchronization signal when the radio pager is receiving a field not assigned to the radio pager or when the radio pager is receiving a field which is assigned to the radio pager in each remaining frame of the block of successive frames following the frame within the set in which the new message was received.

2. A power saving radio pager, comprising:
   a radio frequency receiver for receiving a sequence of frames each comprising a predetermined number of fields respectively assigned to different pagers such that a particular one of the predetermined number of fields within each received frame is assigned to the radio pager, each of the fields containing a message which is repeatedly transmitted in a predetermined number of successive frames;
   a frame detector for detecting a synchronization signal in each field of each received frame;
   a field detector for detecting the field within each received frame which is assigned to the radio pager in response to a detection of a synchronization signal by the frame detector;

a field counter for measuring a time interval elapsed from a detection by the field detector of the assigned field within each received frame, and for producing an output signal when the measured time interval coincides with a timing at which the assigned field is received in a subsequent frame;

a message detector for detecting and storing a message addressed to the radio pager in an assigned field detected by the field detector; and a controller, for periodically activating and deactivating the receiver until a message addressed to the radio pager is detected and stored by the message detector; and upon detection and storage of the message, for deactivating the receiver; and for repeatedly performing an activation/deactivation operation on the receiver by activating the receiver, when the field counter produces an output signal, for a time interval sufficient for the frame detector to detect a synchronization signal, and subsequently deactivating the receiver until the field counter produces another output signal, the activation/deactivation operation being repeatedly performed until the predetermined number of successive frames have been received.

3. A radio pager as claimed in claim 2, wherein each field containing a copy of a message addressed to the radio pager further contains a remaining count number to indicate the number of subsequent frames which contain a duplicate of the message; and wherein the controller includes a memory to store the remaining count number upon detection and storage of the message addressed to the radio pager, the controller additionally including means for decrementing the stored count number by one each time the field detector produces an output signal in a frame subsequent to a frame in which the message was detected and stored, the activation/deactivation operation being performed until the remaining count number is reduced to zero.

4. A power saving radio pager having a unique address assigned thereto, comprising:

a radio frequency receiver for receiving a sequence of frames each comprising a predetermined number of fields respectively assigned to different pagers such that a particular one of the predetermined number of fields within each received frame is also assigned to the radio pager, each of the fields containing at least one of an address and a message, the at least one of an address and a message being repeatedly transmitted in a predetermined number of frames;

a frame detector for detecting a synchronization signal in each field of each received frame;

a field detector for detecting the field within each received frame which is assigned to the radio pager in response to a detection of a synchronization signal by the frame detector;

a field counter for measuring a time interval elapsed from a detection by the field detector of the assigned field within each received frame, and for producing an output signal when the measured time interval coincides with a timing at which the assigned field is received in a subsequent frame;

a payload detector for detecting, in the assigned field within each received frame, either the unique address assigned to the radio pager, or a message addressed to the radio pager in a frame subsequent to a frame in which the unique address is detected;

a controller, for periodically activating and deactivating the receiver until the unique address is detected; and upon detection of the unique address, for deactivating the receiver until the field counter produces an output signal and then reactivating the receiver until a message addressed to the radio pager is detected and stored; and upon storage of the message, for deactivating the receiver; and for repeatedly performing an activation/deactivation operation on the receiver by activating the receiver, when the field counter produces an output signal, for a time interval sufficient for the frame detector to detect a synchronization signal and subsequently deactivating the receiver until the field counter produces another output signal, the activation/deactivation operation being repeatedly performed until the predetermined number of successive frames have been received.

5. A radio pager as claimed in claim 4, wherein each field containing a copy of a message addressed to the radio pager further contains a remaining count number to indicate the number of subsequent frames which contain a duplicate of the message; and wherein the controller includes a memory to store the remaining count number upon detection and storage of the message addressed to the radio pager; the controller additionally including means for decrementing the stored count by one each time the field detector produces an output signal in a frame subsequent to a frame in which the message was detected and stored, the activation/deactivation operation being performed until the remaining count is reduced to zero.

6. A power saving method of operation of a radio pager which includes a radio frequency receiver for receiving a sequence of frames each comprising a predetermined number of fields respectively assigned to different pagers such that a particular one of the predetermined number of fields is assigned to the radio pager, each of the fields containing a message which is repeatedly transmitted in a predetermined number of successive frames, the method comprising the steps of:

a) activating and deactivating the receiver to establish synchronization with the field within each frame which is assigned to the radio pager;

b) periodically activating and deactivating the receiver to determine whether the field assigned to the radio pager in a frame currently being received contains a message addressed to the radio pager, with each activation being performed at a time coincident with a time in which the field assigned to the radio pager is expected to be received in an immediately subsequent frame;

c) upon detection of a message addressed to the radio pager, storing the message and deactivating the receiver;

d) activating the receiver, at a time coincident with a time in which the field assigned to the radio pager is expected to be received in an immediately subsequent frame, for a time interval sufficient to detect the synchronization signal;

e) subsequently deactivating the receiver until a time coincident with a time in which the field assigned to the radio pager is expected to be received in an immediately subsequent frame; and f) repeating steps (d) and (e) until a predetermined number of frames is received.

7. The method according to claim 6, further comprising the steps of:

setting a count value equal to a number of subsequent successive frames containing copies of the message in the field assigned to the radio pager upon detection and storage of the message addressed to the radio pager; and decrementing the count value by one each time the receiver is activated subsequent to the storage of the message, at a time coincident with a time in which the field assigned to the radio pager is expected to be received in each subsequent frame;

wherein the steps (d) and (e) are performed until the count value is reduced to zero.

* * * * *